US008128466B2

(12) United States Patent
Weichholdt et al.

(10) Patent No.: US 8,128,466 B2
(45) Date of Patent: Mar. 6, 2012

(54) HARVESTED MATERIAL RESIDUE CHOPPING AND DISTRIBUTING ARRANGEMENT FOR A COMBINE

(75) Inventors: Dirk Weichholdt, Woelfling les Sarreguemines (FR); Oliver Klein, Saarlouis (DE); Dohn W Pfeiffer, Mimbach (DE); Norbert Pohlmann, Zweibrücken (DE); Friedrich K. Lauer, Krähenberg (DE); Rico Priesnitz, Lebach (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/778,458

(22) Filed: May 12, 2010

(65) Prior Publication Data
US 2010/0291983 A1 Nov. 18, 2010

(30) Foreign Application Priority Data
Aug. 20, 2009 (DE) .......................... 10 2009 028 765

(51) Int. Cl.
*A01F 12/40* (2006.01)
(52) U.S. Cl. ....................................................... 460/112
(58) Field of Classification Search ...... 460/8, 111–113, 460/901
See application file for complete search history.

(56) References Cited

U.S. PATENT DOCUMENTS

| 5,042,973 | A | * | 8/1991 | Hammarstrand | ............. | 460/112 |
| 6,416,405 | B1 | * | 7/2002 | Niermann | ........................ | 460/79 |
| 7,086,942 | B2 | * | 8/2006 | Niermann et al. | ............. | 460/111 |
| 7,281,974 | B2 | * | 10/2007 | Anderson et al. | ............. | 460/111 |
| 2007/0015556 | A1 | | 1/2007 | Johnson et al. | | |
| 2009/0325659 | A1 | * | 12/2009 | Overschelde et al. | ........ | 460/112 |

FOREIGN PATENT DOCUMENTS

| EP | 1269822 A1 * | 1/2003 |
| EP | 1532858 A1 | 5/2005 |
| EP | 2138024 A1 | 12/2009 |

OTHER PUBLICATIONS

European Search Report received Aug. 2, 2010 (5 pages).

* cited by examiner

*Primary Examiner* — Thomas Will
*Assistant Examiner* — Joan Misa (57) ABSTRACT

A harvested material residue chopping and distributing arrangement for a combine (10) is provided having a straw chopper (60) and two distribution blowers (100) between which a guide element (150) is arranged for distributing the harvested material residue flow between the two distribution blowers (100). The tip (156) of the guide element (150) is positioned on the circumferential circle of the straw chopping blades (96) such that the blades (96) remove harvested material residue from the tip (156) during operation.

13 Claims, 7 Drawing Sheets

HARVESTED MATERIAL RESIDUE CHOPPING AND DISTRIBUTING ARRANGEMENT FOR A COMBINE

FIELD OF THE INVENTION

The invention relates to a harvested material residue chopping and distributing arrangement for a combine.

BACKGROUND OF THE INVENTION

Agricultural combines are large machines that harvest, thresh, separate, and clean agriculturally grown harvested material. The resulting clean grain is stored in a grain tank arranged on the combine. The threshed straw is usually either chopped and distributed on the field across the width of the cutting mechanism or fed around the straw chopper and laid in a swath on the field in a non-chopped form in order to be able to be picked up later with a baler. The harvested material residue remaining at the rear outlet of the cleaning device, such as chaff and small straw parts, are distributed on the field by a chaff spreader or fed through the straw chopper and distributed on the field.

DE 199 08 111 C1 describes a combine with a straw chopper and two distribution blowers that are arranged laterally one next to the other and that follow the straw chopper for the widely distributed discharge of the straw across the field. The outlet of the straw chopper and the inlet of the distribution blowers that are arranged in a housing and that comprise impeller paddles rotating about an approximately vertical axis are arranged in a plane for the purpose of a non-direction-changing material discharge. Around the distribution blowers, casings are mounted that come together between the distribution blowers in a forward tip facing the straw chopper. In the rear region, the casings are separated, in order to discharge the straw onto the field. The distribution blowers that rotate inward with their front sides extend laterally across the straw chopper, wherein each of their rotational axes is located in the vicinity of an outer end of the straw chopper.

The casings forming a forward tip facing the straw chopper are arranged at a relatively large distance from the enveloping circle of the chopping blades of the straw chopper. In particular, in the case of relatively damp harvested material residue, this residue collects on the front side of the tip of the casings, which could lead to undesired blockages.

The problem forming the basis of the invention is to be seen in that a harvested material residue chopping and distributing arrangement is provided with a straw chopper and two distribution blowers arranged downstream of the straw chopper for a combine in which the tendency for blockages at the tip of the guide element dividing the harvested material stream between the distribution blowers is reduced and in which the function of distributing the harvested material streams to the distribution blowers by the guide element is improved.

SUMMARY OF THE INVENTION

In accordance with one aspect of the invention, a harvested material residue chopping and distributing arrangement for a combine is provided that includes a straw chopper and two distribution blowers arranged downstream of the straw chopper with respect to the direction of material flow. In the harvesting operation, the straw chopper may chop the harvested material residue fed to it, in particular, straw. Other harvested material residue, for example, chaff, may also be supplied to its blades and optionally additional feed paddles, whether it is together with the straw in the chopping operation or selectively only this harvested material residue in a straw swath-laying mode in which the straw is led past the straw chopper. The harvested material residue fed from the straw chopper may be picked up by the two distribution blowers and distributed across the field. For this purpose, the distribution blowers rotate in the opposite sense, wherein the regions of the distribution blowers facing the straw chopper rotate toward each other. The left distribution blower may face the forward direction when it is viewed from above and may rotate in the clockwise direction, while the right distribution blower may face in the forward direction viewed from above, and may rotate in the counterclockwise direction. Between the distribution blowers, a guide element may be mounted that leads the harvested material residue stream in the region between the distribution blowers. The guide element may have a forward tip that faces the straw chopper and that is positioned relative to the enveloping circle of the chopping blades such that the chopping blades remove harvested material residue from the tip.

In this way, undesired harvested material collections at the tip may be avoided and, because the harvested material streams are divided at a position at which the harvested material residue is actively fed, the distribution of the harvested material streams to the two distribution blowers may be also improved. The tip works like a counter blade, in order to guarantee the proper distribution of the harvested material streams.

In one possible embodiment, the tip of the guide element may be arranged with a small gap outside of the enveloping circle of the chopping blades, wherein its shape is adapted to the enveloping circle of the chopping blades.

In another embodiment, the tip of the guide element may dip into the enveloping circle of the chopping blades of the straw chopper, in particular, between two adjacent chopping blades suspended so that they swing together on a rotor of the straw chopper.

On the tip of the guide element there may be a cutting edge in order to reduce the friction of the harvested material on the tip and reduce tip wear. If one looks at a cross section through the tip, the cutting edge may be located centered or on the outside of the cutting edge. Advantageously, the cutting edge is mounted on a blade that is attached on the guide element so that it can be removed.

With respect to the relative arrangement of the straw chopper and distribution blowers relative to each other, different options are possible in the scope of the concept according to the invention. Thus, the straw chopper may load the distribution blower in the exact radial direction (cf. DE 199 08 111 C1) or the radial outer edge of the distribution blower at an acute or obtuse angle (see US 2007/0015556 A1) or the harvested material residue may be fed to the distribution blower in the axial direction at an acute or obtuse angle, with (see WO 2008/156419 A1) or without (see DE 10 2007 037 485 B3) deflection of the harvested material residue downstream of the straw chopper by a deflection element. In this way, between the straw chopper and the distribution blower, a gap remains open to the surroundings, or a harvested material residue guide element is attached between the outlet of the straw chopper housing equipped with a concave floor and the distribution blower that could be constructed as a pure guide element and that does not deflect the harvested material residue stream or deflects it in a desired direction, as is described, in particular, in WO 2008/156419 A1.

In particular, the harvested material residue stream enters in the forward direction in front of the rotational axes of the distribution blowers, wherein the deflection in an outer or inner region is not performed differently.

BRIEF DESCRIPTION OF THE DRAWINGS

With reference to the figures, several embodiments of the invention will be explained, in which:

FIG. 2 is an enlarged lateral view of the straw chopper and a distribution blower with a first embodiment of a guide element arranged in-between.

FIG. 5 is a lateral view further enlarged relative to FIG. 2 for the straw chopper and the distribution blower with a second embodiment of a guide element arranged in-between.

DETAILED DESCRIPTION OF THE PREFERRED EMBODIMENTS

Figure 1:
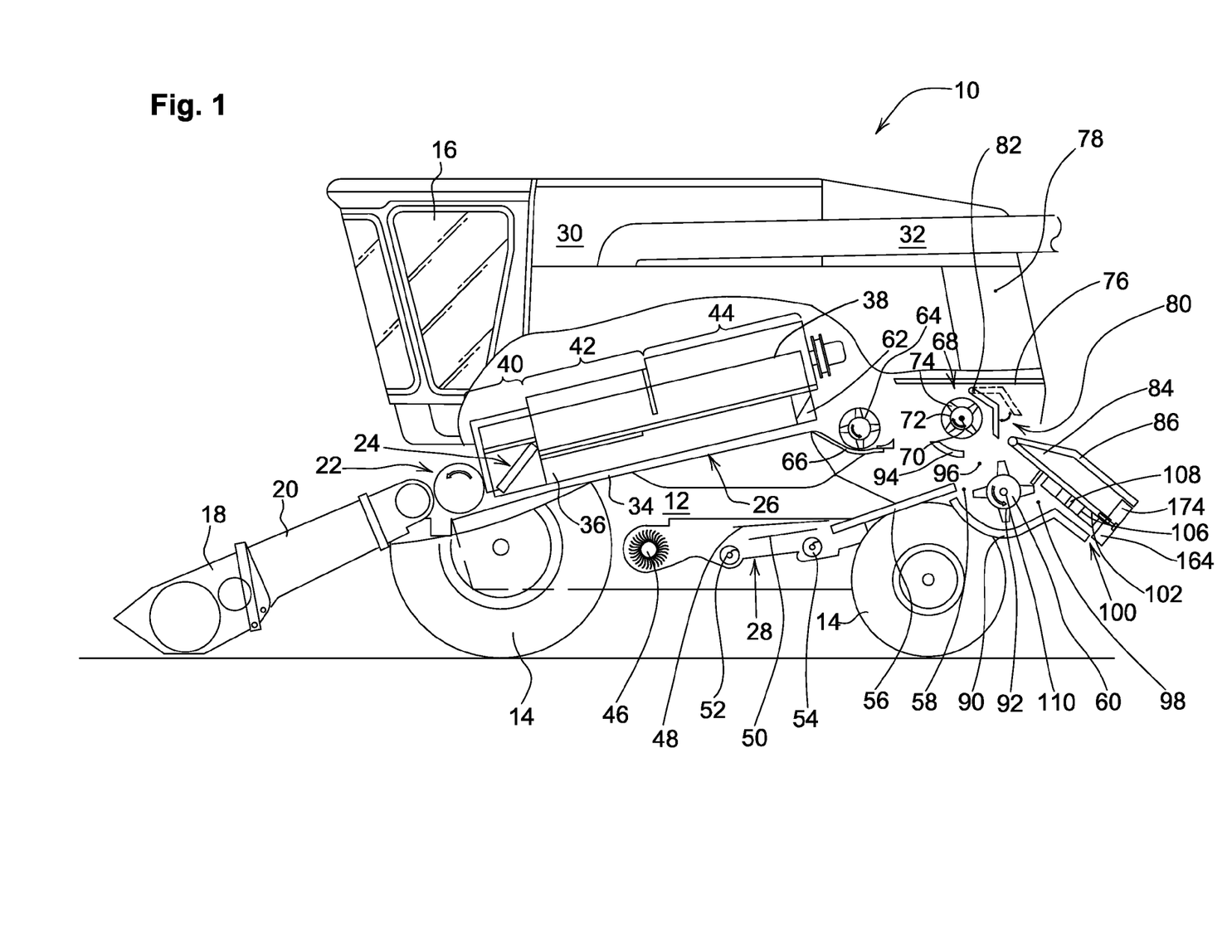
FIG. 1 is a partially cutaway lateral view of a combine with a straw chopper and distribution blowers.

FIG. 1 shows an agricultural combine 10 with a chassis 12 with wheels 14 that are in contact with the ground and that are mounted on the chassis 12 and used for driving the combine 10 in a forward direction that runs toward the left in FIG. 1. The operation of the combine 10 is controlled from the control cabin 16. A cutting mechanism 18 is used to harvest the harvested material containing grain and to feed it to a slope conveyor 20. The harvested material is fed by the slope conveyor 20 to a guide drum 22. The guide drum 22 guides the harvested material through an inlet transition section 24 to an axial harvested material processing device 26. In the following, directional information, such as front and back, refer to the forward direction of the combine 10 that runs toward the left in FIG. 1.

The harvested material processing device 26 comprises a rotor housing 34 and a rotor 36 arranged in this housing. The rotor 36 comprises a hollow drum 38 on which material processing elements for a feeding section 40, a threshing section 42, and a separating section 44 are mounted. The feeding section 40 is arranged on the front side of the axial harvested material processing device 26. Downstream in the longitudinal direction and behind the feeding section 40 are the threshing section 42 and the separating section 44. The drum 38 has a truncated-cone-like shape in the feeding section 40. The threshing section 42 comprises a truncated-cone-like front section and a cylindrical rear section. A cylindrical separating section 44 of drum 38 is located at the end of the axial harvested material processing unit 26. In an alternative arrangement, instead of an axial harvested material processing unit 26, a tangential threshing drum and an axial separating device following it or straw walkers following it could be used.

Grain and chaff that fall through a threshing basket allocated to the threshing section 42 and a separating grate allocated to the separating section 44 are fed to a cleaning system 28 with a blower 46 and lamellar screens 48, 50 that can be set into an oscillating motion. The cleaning system 28 removes the chaff and feeds the clean grain via a screw conveyor 52 to an elevator for clean grain (not shown). The elevator for clean grain deposits the clean grain in a grain tank 30. The clean grain in the grain tank 30 can be unloaded by an unloading screw conveyor 32 onto a grain wagon, trailer, or truck. Harvested material remaining at the rear end of the lower lamellar screen 50 is fed again to the harvested good processing device 26 by means of a screw conveyor 54 and a conveyor for the return of tailings (not shown). The harvested material residue discharged at the rear end of the upper lamellar screen 48 consists essentially of chaff (husk) and small straw particles, which is then fed through a swinging floor conveyor 56 rearward into an inlet 58 of a straw chopper 60.

Threshed straw leaving the separating section 44 is ejected through an outlet 62 from the harvested material processing device 26 and fed to a discharge drum 64. The discharge drum 64 interacting with a floor 66 arranged underneath ejects the straw backward. Behind the discharge drum 64 and approximately at the vertical height of its rotational axis there is another conveyor in the form of a drum conveyor 68 functioning as an overshoot. The drum conveyor 68 extends horizontally and perpendicular to the forward direction and can be set in rotation by a suitable drive about its axis 70, on which it is mounted so that it can rotate on the chassis 12 in a rotational direction in which it functions as an overshoot and rotates in the clockwise direction in FIG. 1, as indicated by the arrow. For driving the drum conveyor 68, as a rule a hydraulic motor is used. The drum conveyor 68 corresponds in its construction to the discharge drum 64 and comprises a rotationally symmetric drum 72 with circumferentially distributed drivers 74 distributed around its periphery and attached rigidly to this casing. Underneath the drum conveyor 68 there is a tray 94.

Above the discharge drum 64 and the drum conveyor 68, an upper wall 76 is attached that extends horizontally and in the forward direction and that closes the bottom of an engine compartment 78 located above. On the wall 76 there is a flap 80 on its front end adjacent to the drum conveyor 68, with this flap being hinged so that it can pivot about an axis 82 extending horizontally and perpendicular to the forward direction between a swath-laying position and a chopping position. The flap 80 is curved concavely, wherein the radius is adapted to the drum conveyor 68.

Underneath the lower and rear end of the flap 80, a plate 84 connected rigidly to the chassis 12 attaches without a gap (for the flap 80 located in the chopping position), with this plate extending at an angle backward and downward and connecting to an adjacent chute 86 on which the straw can slide downward onto the field in the swath-laying mode. The straw swath can also be made into a desired shape by skids or straw guide plates (not shown) attached to the top side of the chute 86.

The flap can pivot about the axis 82 between the chopping position in which it is shown in FIG. 1 with solid lines and a swath-laying position in which the flap 80 is shown in the figure with dashed lines and it extends backward above the straw flow.

Underneath the plate 84 there is the straw chopper 60 that is assembled from a straw chopper housing 90 and a rotor 92 that is arranged in this housing and that can rotate about an axis running horizontally and perpendicular to the forward direction with chopping blades 96 suspended so that they can swing and distribute around the periphery of the rotor 92. On the rotor 92, additional impeller paddles (not shown) can also be mounted or a few or all of the chopping blades 96 can comprise impeller paddles for supplying air. Downstream of an outlet 98 of the straw chopper 60 there are two distribution blowers 100 arranged laterally one next to the other underneath the chute 86; of these blowers, only one can be seen in FIG. 1. The distribution blowers 100 comprise a number of impeller paddles 102 each of which can be set in rotation by a hydraulic motor 106 about its rotational axis 108 (extending approximately vertically, but inclined slightly backward and upward) and to which the straw chopper 60 feeds the harvested material residue from below in the axial direction under an obtuse angle relative to the rotational axes of the distribution blowers 100.

The rotational axis 110 of the rotor 92 of the straw chopper 60 extends horizontally and perpendicular to the forward direction. The distribution blowers 100 are arranged laterally one next to the other at the back of the straw chopper 60. The distribution blowers 100 are located within the width of the straw chopper 60. The distribution blowers 100 are mounted by holders (not shown) on the frame 12 of the combine 10 and/or on the chute 86. It would also be possible to arrange the straw chopper 60 and the distribution blowers 100 such that the straw chopper 60 loads the distribution blowers 100 from above. In the case of a different embodiment, the rotational axes 108 of the distribution blowers 100 are horizontal or exactly vertical.

In the swath-laying position of the flap 80, the straw chopper 60 feeds only the harvested material residue from the cleaning system 28 to the distribution blowers 100 that distribute this residue onto the field approximately across the width of the cutting mechanism 18. In the chopping mode, the straw chopper 60 also chops the straw at the outlet 62 of the harvested material processing device 26, wherein this straw has been ejected by the discharge drum 64 and the drum conveyor 68 against the flap 80 and then falls downward into the inlet 58 of the straw chopper 60.

Figure 2:
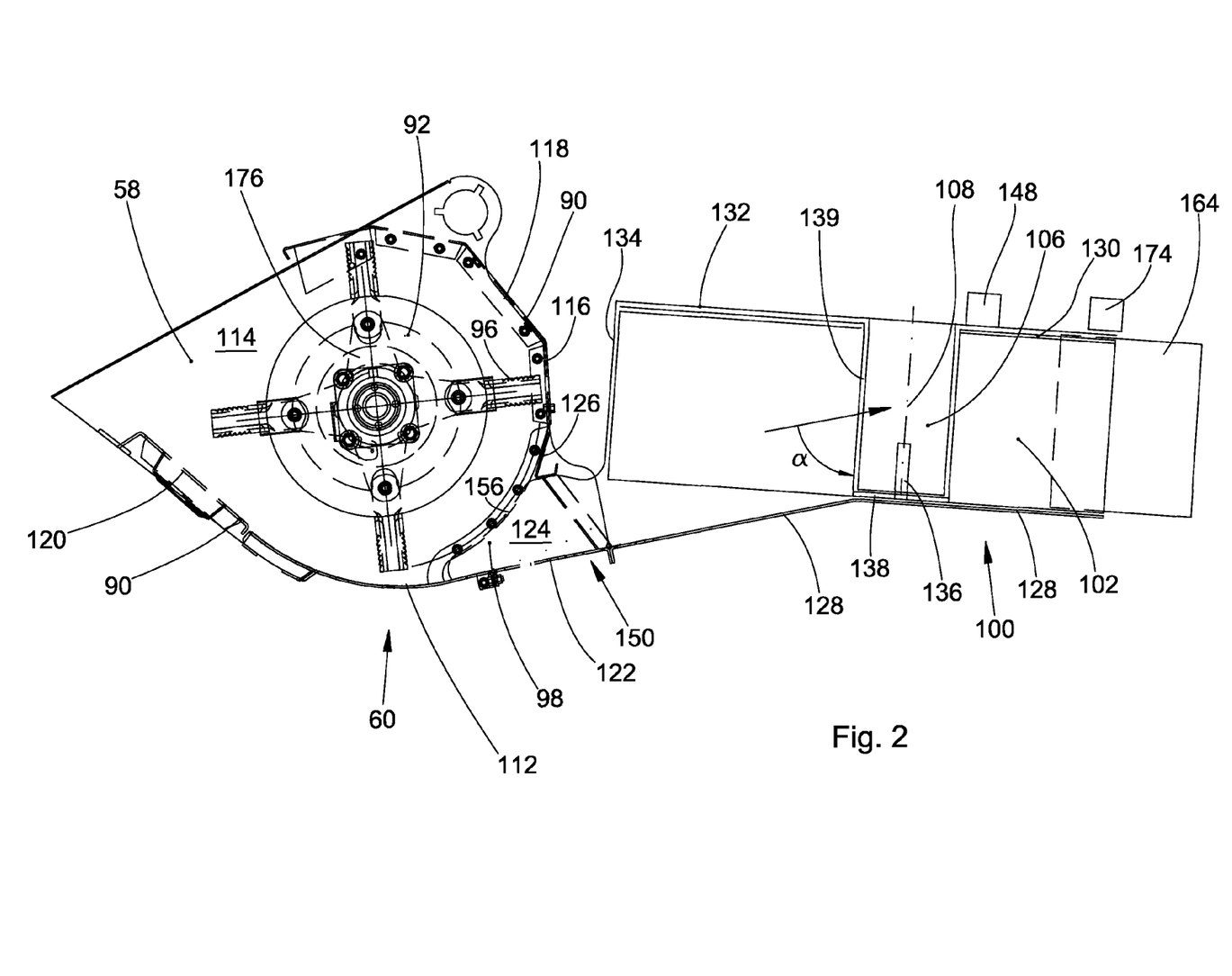
Figure 3:
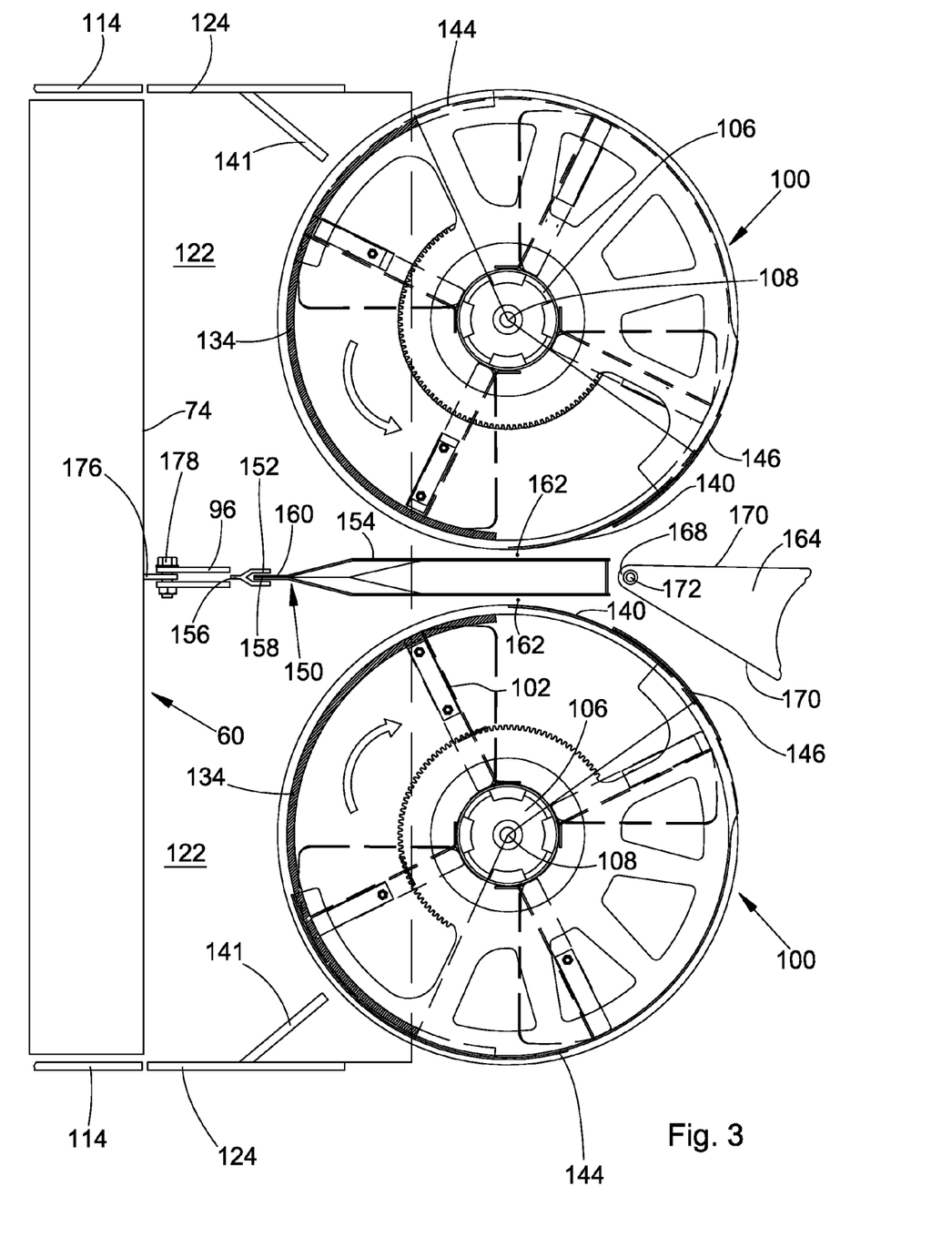
FIG. 3 is a top view of the straw chopper and the distribution blowers.

Reference is now made to FIGS. 2 and 3 in which the harvested material residue chopping and distributing arrangement of the combine 10 is shown in a side view (FIG. 2) and a top view (FIG. 3). The harvested material residue chopping and distributing arrangement comprises the straw chopper 60 and the distribution blowers 100. The straw chopper housing 90 comprises a floor 112, two side walls 114, and additional cross plates 116, 118, 120 that connect, like the floor 112, the side walls 114 to each other and that enclose the rotor 92. The floor 112 is arranged on the bottom side of the straw chopper housing 90 and encloses the enveloping circle defined by the chopping blades 96 in a circular-arc shape at a relatively small distance with a radius. Counter blades (180, cf. FIG. 5) could also be provided that are mounted on the straw chopper housing 90 and penetrate into the enveloping circle of the chopping blades 96, in order to effectively chop the harvested material residue.

Figure 4:
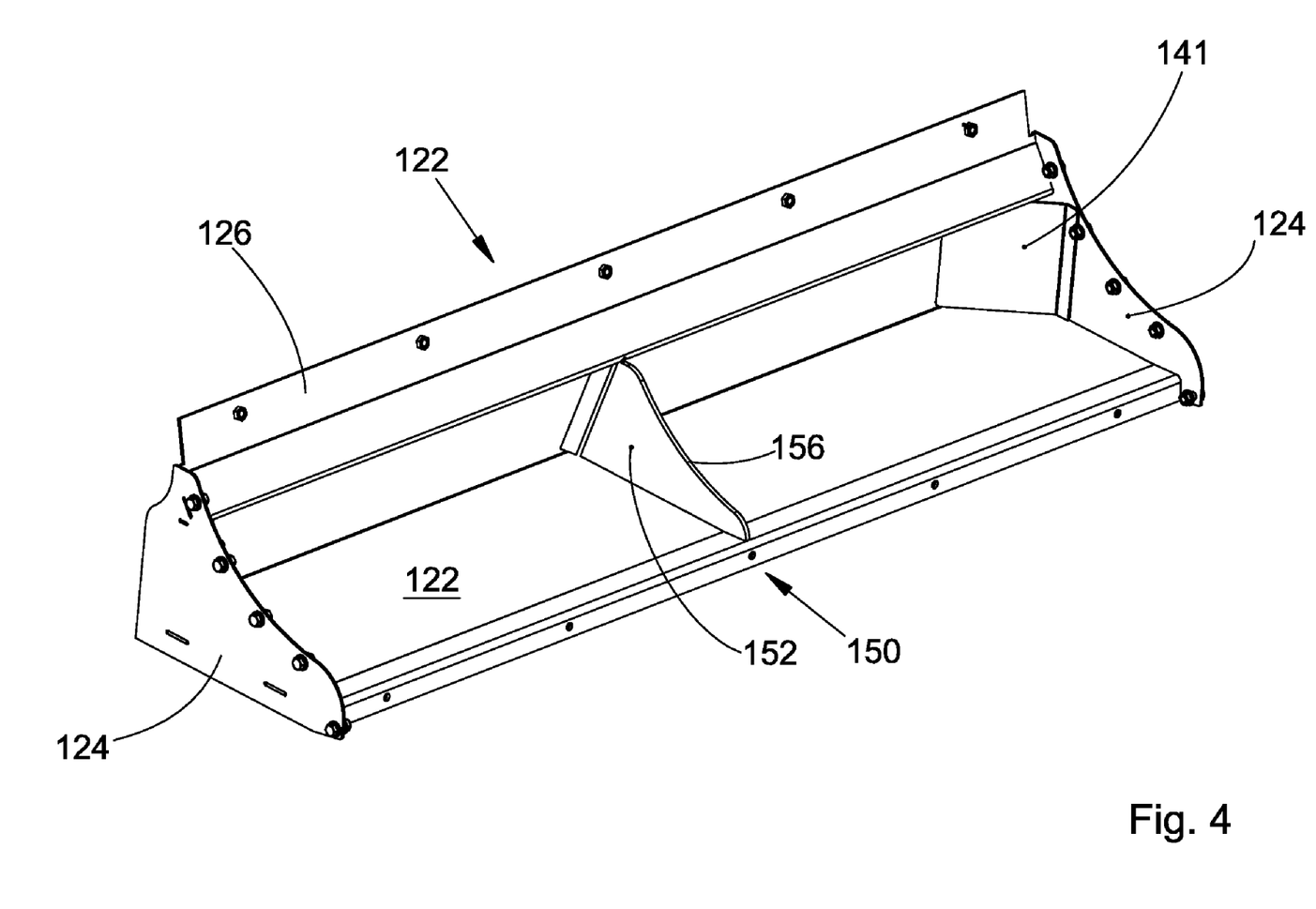
FIG. 4 is a perspective view of a harvested material residue guide element with the guide element mounted on this.

A harvested material residue guide element 122 that is shown in FIG. 4 in a perspective view attaches to the floor 112 in the direction of flow of the harvested material residue. The harvested material residue guide element 122 is arranged between side wall extensions 124 that are each connected to a side wall 114 of the straw chopper housing 90 by screw connections and that extend parallel to this side wall. The harvested material residue guide element 122 is flat (consequently has a radius of infinity). The harvested material residue guide element 122 is angled downward at its front end, in order to form a flange that is screwed with a similarly downward angled flange onto the rear side of the floor 112. Through this connection, projecting edges are avoided at which harvested material residue could collect. On the top side of the side wall extensions 124 there is a cross plate 126 that limits the outlet 98 of the straw chopper 60 upward. At the top, a cross plate 116 of the straw chopper housing 90 attaches to the cross plate 126. It should also be noted that the harvested material residue guide element 122 could be produced in one piece with the floor 112, as also the side wall extensions 124 could be produced in one piece with the side walls 114. However, the shown, two-piece embodiment could use the straw chopper 60 without a harvested material residue guide element 122 and side wall extensions 124 (or with a different harvested material residue guide element and different side wall extensions, not shown) in combination with a distributor floor with adjustable guide plates.

On the side wall extensions 124 (see FIG. 4), outer guide elements 141 are mounted that extend inward and backward at an angle of approximately 45°. They are rectangular in top view and can be curved across their entire length or only in their front region that attaches to a region connected to the side wall extension 124 and extending parallel to this extension. In the vertical direction, the outer guide elements 141 are flat. It would also be possible to mount the outer guide elements 141 additionally or exclusively on the harvested material residue element 122. They could also be shaped in the form of a plowshare or a skid.

On the bottom side of the distribution blowers 100 there is an angled floor plate 128 that extends from a position shortly before the rotational axes up to the rear end of the distribution blowers. The floor plate 128 has a front section that extends in the plane of the harvested material residue guide element 122 and attaches with a downward angled flange to a downward angled flange of the harvested material residue guide element 122. These flanges could be screwed to each other or could only contact each other, in order to bring the distribution blowers 100 into a transport position slightly separated from the straw chopper 60. The front section of the floor plate 128 extends from the mentioned flange up to shortly in front of the rotational axis 108 of the distribution blowers 100 and transitions there into a rear section that extends under the rear end of the distribution blower 100 and orthogonal to the rotational axis 108.

The lower output shafts 136 of the hydraulic motors 106 mounted on the cover 132 drive the impeller paddles 102 by means of a cross connection 138 and a cylindrical shaft 139 that is mounted on its upper end to a plate 130 with a middle opening. The impeller paddles 102 of the distribution blowers 100 each extend exactly across the axial dimension of the shaft 139. With the top sides, the impeller paddles 102 contact onto the plate 130 or are mounted on this plate (e.g., welded). Above the plate 130 there is a cover 132 that covers the distribution blowers 100 at the top and on whose front side there are two partial casings 134 radially enclosing a distribution blower 100 at the front with a semicircular shape. Additional partial casings 140 contact the adjacent inner sides of the distribution blowers 100, wherein gaps 142 still remain between the partial casings 134 and the partial casings 140.

Between the two distribution blowers 100 there is a two-part guide element 150 comprising a front part 152 and a rear part 154. The front part 152 is mounted on the harvested material residue guide element 122 and adapted with its front tip 156 to the enveloping circle of the chopping blades 96, so that it has a circular-arc-like shape across its tip 156 adjacent to the enveloping circle of the chopping blades 96, and this tip 165 is arranged at a relatively small distance outside of the enveloping circle of the chopping blades 96, so that the chopping blades 96 prevent harvested material residue from collecting at the tip 156 by means of continuously discharging this residue. On its rear side, the front part 152 forms a slot 158 in which a flat, front plate 160 of the rear part 154 penetrates. Behind the front plate 160, the rear part 154 expands and is hollow. The rear part 154 is mounted on the bottom side of the cover 132 and on the top side of the floor plate 128 that form, with the partial casings 134, 140 and the shields 144, 146, a distribution blower housing.

With reference to FIG. 3 it can be seen that passages 162 are present between the guide element 150 and the partial casings 134, 140 of the distribution blowers 100 adjacent to this element, wherein a part of the harvested material residue stream discharged in the middle region of the straw chopper 60 can flow rearward through these openings from the straw chopper 60 onto the field.

Behind the rear part 154 of the guide element 150 there is a moving guide element 164 with a front tip 168 that is located behind the rotational axes 108 of the distribution blowers 100 in the area underneath and outside of the area swept by the blowers and two divergent, lateral, straight walls 170 each of which is arranged adjacent to an distribution blower 100. The moving guide element 164 can be set into a swinging motion about a forward axis 172 that extends parallel to the rotational axis 108 of the distribution blower 100 by a drive 174 mounted above the cover 132 behind the hydraulic motors 106. For this purpose, refer to DE 10 2007 037 485 B3 and DE 10 2008 055 003 A1, whose disclosure is included in the present documents through this reference.

The partial casings 140 are equipped with a higher, rear section and a lower, front section between which a diagonally rising region is provided. The partial casings 140 can be extended on their rear ends selectively by shorter or longer angular regions, in that first and second shields 144, 146 are positioned with different dimensions in the peripheral direction by means of an adjustment drive 148 controlled manually by the operator from the cabin 16 or automatically as a function of the position of the flap on the rear ends of the partial casings 140, in order to deflect the harvested material residue more or less outward, in that they cover the impeller blowers 100 and prevent the free discharge of harvested material residue radially outward, so that the harvested material residue can leave the distribution blowers 100 only after it has passed the shields 144 or 146. Therefore, in the swath-laying mode, by moving the first, longer shield 144 to the rear, inner end of the partial casing 140 it is achieved that the chaff is placed laterally next to the swath or, in the straw-chopping mode, the harvested material residue is distributed uniformly across the field, in that the second, shorter shield 146 is moved to the rear, inner end of the partial casing 140. In addition, the shields 144, 146 of both distribution blowers 100 could be adjusted independently of each other, in order to equalize influences due to crosswinds and/or side sloping.

Figure 5:
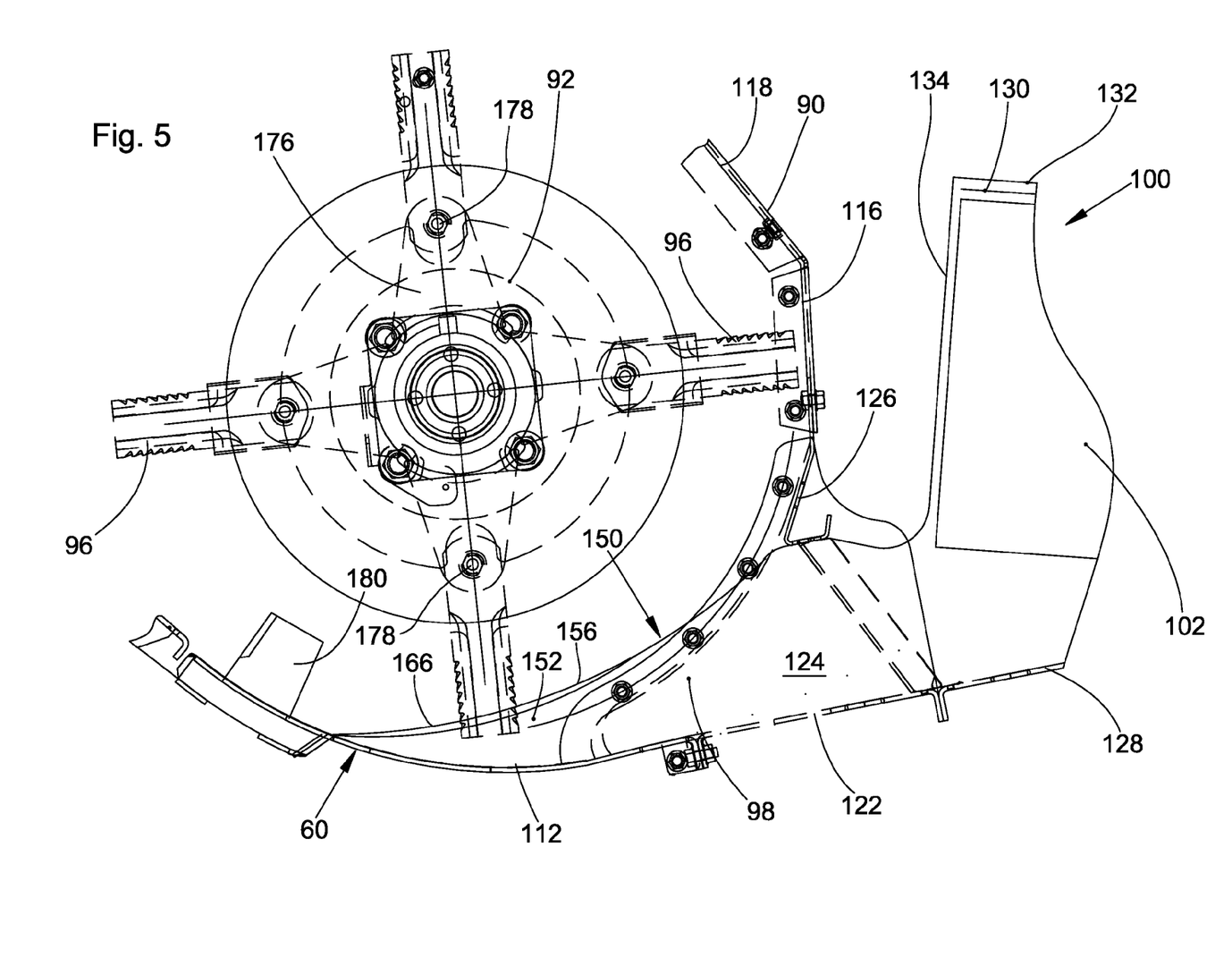
Figures 6, 7, 8, 9, 10:
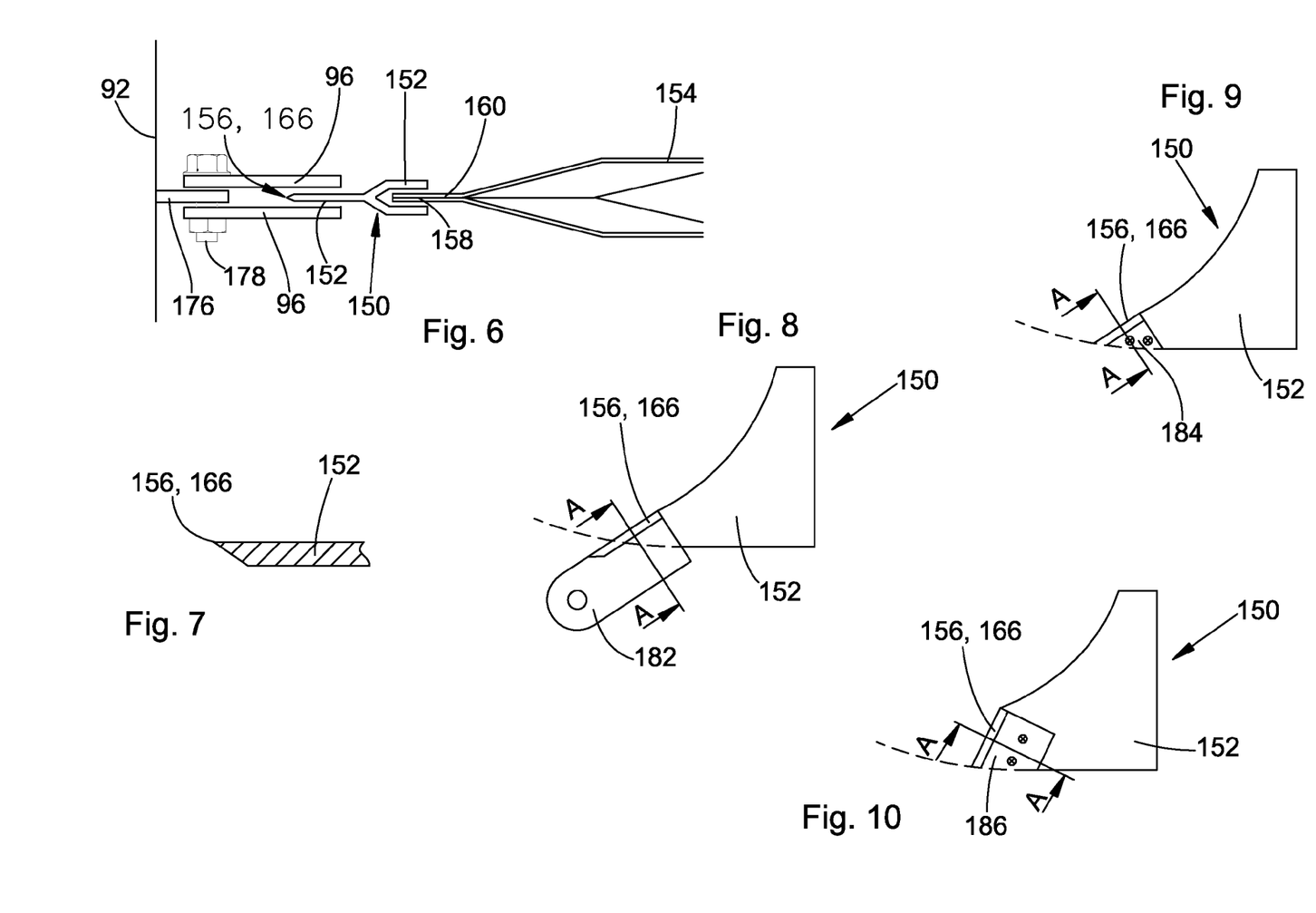
FIG. 6 is a top view of a chopping blade pair of the straw chopper and the guide element from FIG. 5.
FIG. 7 is a cross section through another embodiment of a tip of the guide element.
FIG. 8 is a lateral view of a third embodiment of a guide element.
FIG. 9 is a lateral view of a fourth embodiment of a guide element.
FIG. 10 is a lateral view of a fifth embodiment of a guide element.

In FIGS. 5 and 6, a second embodiment of the front part 152 of a guide element 150 in which, in contrast to the first embodiment according to FIGS. 2-4, the tip 156 dips into the enveloping circle of the chopping blades 96. The front part 152 with the tip 156 thus penetrates into the intermediate space between two adjacent chopping blades 96 mounted by a screw 178 together on a bracket 176. Furthermore, on the tip 156 there is a cutting edge 166 symmetric to the longitudinal plane of the front part. The cutting edge 166 could also be replaced by the embodiment according to FIG. 7 in which the cutting edge 166 is located on the outside on the tip 156. Cutting edges 166 according to FIG. 6 or 7 could also be used in the first embodiment according to FIGS. 2-4.

In the embodiment shown in FIG. 5, the tip 156 extends with the cutting edge 166 from the floor 112 at a relatively acute angle to the enveloping circle of the chopping blades 96 backward and upward to the cross plate 126. The front two-thirds of the tip 156 are equipped only approximately with a cutting edge 166, because nearly all of the harvested material residue flows past this region, while relatively little harvested material residue is present in the upper, rear region of the tip 156 and are divided between the two distribution blowers 100, so that a cutting edge 166 mounted there is unnecessary.

The embodiments according to FIGS. 8-10 have, in contrast to the embodiment according to FIGS. 5 and 6, separate, exchangeable blades 182, 184, 186 that form the tips 156 with the cutting edge 166. The blades 182, 184, 186 are connected on the front part 152 of the guide element 150 (blades 184, 186 according to FIGS. 9 and 10) or to a suitable holder underneath the floor 112 of the straw chopper 60 by screw connections (blades 182 according to FIG. 8) that could be attached on the floor 112 or the front part 152 of the guide element 150.

The cross sections through the blades 182, 184, 186 along the lines A-A can correspond to the cross section of FIG. 7 or to that of FIG. 6. For the embodiment according to FIG. 8, the blade 182 is a chopping blade 96 for a straw chopper 60, whose cutting edge 166 can be equipped with or without serrations. In the case of the embodiment according to FIG. 9, the blade 184 is a chopping blade for the chopping drum of a field chopper, whose cutting edge 166 can likewise be equipped with or without serrations. For the embodiment according to FIG. 10, the blade 186 is a triangular knife blade for a cutting mechanism (for example, the harvesting attachment 18), whose cutting edge 166 can likewise be equipped with or without serrations. The cutting edges 166 can be set at a relatively acute angle to the incoming harvested material residue stream, as shown in FIGS. 5, 8, and 9, or at an obtuse angle, as shown in FIG. 10. For the embodiments according to FIGS. 8-10, the cutting edge 166 extends across only an outer part of the length of the tip 156 that is adjacent to the floor 112 of the straw chopper housing 90.

Figure 11:
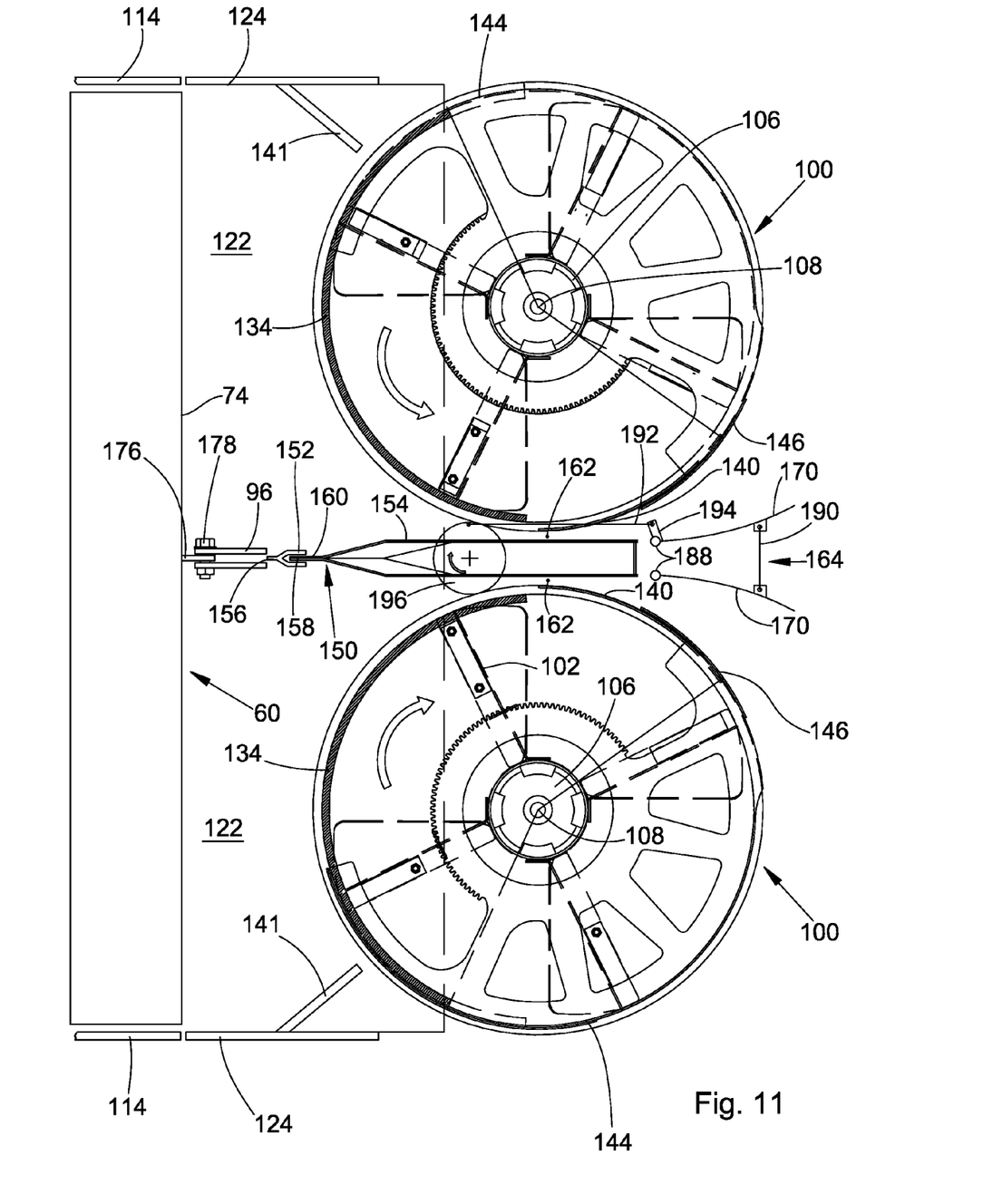
FIG. 11 is a top view of the distribution blower analogous to FIG. 3, but with another embodiment of a guide element.

Finally, reference is made to FIG. 11 that shows an embodiment basically corresponding to the embodiment according to FIGS. 2-5. In contrast, the moving guide element 164 is constructed from two walls 170 that are supported so that can pivot about pivot axes 188 separately from each other immediately behind the rear part 154 of the guide element 150. The pivot axes 188 extend parallel to the rotational axes of the distribution blowers 100. The walls 170 are each curved concavely with a diameter that corresponds approximately to the diameter of the distribution blower 100 or to the diameter of the partial casings 140. The walls 170 are connected to each other by a coupling bar 190 that is hinged on both walls 170. A connecting rod 192 connects a peg 194 that is connected to one of the walls 170 and that rotates with the wall 170 about the pivot axis 188 to a drive wheel 196 that can be set in rotation by the drive 174. The connecting rod 192 is hinged eccentrically relative to the rotating point of the drive wheel 196. The function of the guide element 164 in FIG. 11 corresponds to that of the guide element 164 of FIG. 3.

The invention claimed is:

1. A harvested material residue chopping and distributing arrangement for a combine (10) moveable in a forward direction over a field, the harvested material residue chopping and distributing arrangement comprising:

a straw chopper (60) equipped with chopping blades (96), two distribution blowers (100) arranged laterally one next to the other downstream of the straw chopper (60) and that rotate in opposing directions during operation, each of the blowers (100) having a rotational axis (108) and each of the blowers having a portion facing the straw chopper, wherein said portions of the blowers (100) facing the straw chopper (60) move toward each other during operation;

a guide element (150) disposed between the two distribution blowers (100) and comprising a tip (156) facing the straw chopper (60), wherein the tip (156) of the guide element (150) is positioned in the vicinity of an envelope circle of the chopping blades (96) such that, during operation, the chopping blades (96) remove harvested material residue from the tip (156), wherein the straw chopper (60) is arranged within a straw chopper housing (90) with a concave floor (112) and a flat harvested material residue guide element (122) adjoins a rear end of the floor (112) of the straw chopper housing (90), wherein the guide element (150) comprises a front part (152) and a rear part (154), wherein the front part (152) is mounted on the harvested material residue guide element (122), wherein the front part (152) comprises the tip (156) and a slot (158) is formed on the rear side of the front part (152), wherein the rear part comprises a flat front plate (160), and wherein the flat front plate (160) penetrates into the slot (158), wherein the rear part (154) is hollow, and the rear part (154) expands laterally behind the front plate (160) and the rear part (154) is mounted on a top side of an angled floor plate (128), and the angled floor plate (128) has a front section that extends in a plane of the harvested material residue guide element (122) between a rear end of the harvested material residue guide element (122) and a rear end of the front section of the angled floor plate (128) at a position slightly in front of the rotational axes (108) of the distribution blowers (100), the angled floor plate (128) transitioning at the rear end of the front section of the angled floor plate (128) into a rear section of the angled floor plate (128) that extends under a rear end of the distribution blowers (100) and extends orthogonal to the rotational axes (108).

2. The harvested material residue chopping and distributing arrangement according to claim 1, wherein the tip (156) of the guide element (150) is nestled up to the envelope circle of the chopping blades (96) of the straw chopper (60) with a small gap between the envelope circle of the chopping blades (96) and the tip (156).

3. The harvested material residue chopping and distributing arrangement according to claim 1, wherein the tip (156) of the guide element (150) dips into the envelope circle of the chopping blades (96) of the straw chopper (60).

4. The harvested material residue chopping and distributing arrangement according to claim 3, wherein the tip (156) of the guide element (150) dips into the envelope circle of the chopping blades (96) of the straw chopper (60) between two adjacent chopping blades (96) suspended so that they swing together on a rotor (92) of the straw chopper (60).

5. The harvested material residue chopping and distributing arrangement according to claim 1, wherein a cutting edge (166) is provided on the tip (156) of the guide element (150).

6. The harvested material residue chopping and distributing arrangement according to claim 5, wherein the cutting edge (166) is located in cross section either centered on or on the outside edge of the tip (156).

7. The harvested material residue chopping and distributing arrangement according to claim 1, wherein a cutting edge (166) is provided on a blade (182, 184, 186) that is attached to the guide element (150) so that it can be removed.

8. The harvested material residue chopping and distributing arrangement according to claim 5, wherein the cutting edge (166) extends across only an outer part of the length of the tip (156).

9. The harvested material residue chopping and distributing arrangement according to claim 1, wherein the tip (156) or a cutting edge (166) mounted on the tip is arranged at an obtuse or acute angle relative to an incoming harvested material residue stream.

10. The harvested material residue chopping and distributing arrangement according to claim 1, wherein the straw chopper (60) is arranged such that the straw chopper loads the distribution blowers (100) during operation with a harvested material residue stream flowing into the distribution blowers (100) at an angle ($\alpha$) with respect to the rotational axes (108) of the distribution blowers (100).

11. The harvested material residue chopping and distributing arrangement according to claim 1, wherein the straw chopper (60) is arranged within the straw chopper housing (90) with a concave floor (112) and that a flat harvested material residue guide element (122) that deflects or that does not deflect the harvested material stream is positioned between the floor (112) of the straw chopper housing (90) and the distribution blowers (100).

12. The harvested material residue chopping and distributing arrangement according to claim 1, wherein a harvested material residue stream enters in the forward direction in front of the rotational axes (108) of the distribution blowers (100).

13. A combine (10) with a harvested material residue chopping and distributing arrangement according to claim 1.

* * * * *